United States Patent
Tomita et al.

(10) Patent No.: US 8,017,214 B2
(45) Date of Patent: Sep. 13, 2011

(54) METHOD FOR PRODUCING HONEYCOMB STRUCTURE AND HONEYCOMB STRUCTURE

(75) Inventors: Takahiro Tomita, Chita (JP); Kaori Takahashi, Nagoya (JP); Kenji Morimoto, Kasugai (JP); Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 254 days.

(21) Appl. No.: 11/684,759

(22) Filed: Mar. 12, 2007

(65) Prior Publication Data

US 2007/0148404 A1    Jun. 28, 2007

Related U.S. Application Data

(63) Continuation of application No. PCT/JP2005/019567, filed on Oct. 25, 2005.

(30) Foreign Application Priority Data

Oct. 29, 2004    (JP) ................. 2004-315326

(51) Int. Cl.
*B32B 3/12* (2006.01)
*B01J 23/02* (2006.01)

(52) U.S. Cl. ............. 428/116; 502/340; 502/439

(58) Field of Classification Search ............ 502/340, 502/439; 428/116
See application file for complete search history.

(56) References Cited

U.S. PATENT DOCUMENTS

| | | | |
|---|---|---|---|
| 4,295,892 A | | 10/1981 | Matsuhisa et al. |
| 4,849,275 A | * | 7/1989 | Hamaguchi et al. .......... 428/116 |
| 6,004,501 A | * | 12/1999 | Cornelius et al. ............. 264/631 |
| 6,048,490 A | * | 4/2000 | Cornelius et al. ............. 264/631 |
| 6,077,796 A | | 6/2000 | Beall et al. |
| 6,203,882 B1 | | 3/2001 | Koike et al. |
| 6,319,870 B1 | | 11/2001 | Beall et al. |
| 6,773,481 B2 | | 8/2004 | Noguchi et al. |
| 2004/0029707 A1 | * | 2/2004 | Beall et al. ..................... 501/119 |
| 2005/0069469 A1 | * | 3/2005 | Fu et al. ......................... 422/177 |

FOREIGN PATENT DOCUMENTS

| | | |
|---|---|---|
| JP | 52-123408 A1 | 10/1977 |
| JP | 07-138077 A1 | 5/1995 |
| JP | 11-092214 A1 | 4/1999 |
| JP | 11-100259 A1 | 4/1999 |
| JP | H11-092214 * | 4/1999 |
| JP | H11-100259 * | 4/1999 |
| JP | 11-309380 A1 | 11/1999 |
| JP | 2002-219319 A1 | 8/2002 |
| JP | 2002-284582 A1 | 10/2002 |
| JP | 2004-284950 A1 | 10/2004 |
| WO | WO 00/30995 A1 | 6/2000 |

* cited by examiner

*Primary Examiner* — Emily M Le
*Assistant Examiner* — Daniel Berns
(74) *Attorney, Agent, or Firm* — Burr & Brown

(57) ABSTRACT

A method for producing a honeycomb structure is provided, where a body containing a forming formulation composed of a cordierite forming material and an organic binder is formed into a honeycomb shape to prepare a honeycomb shaped article, and the honeycomb shaped article is fired to obtain a honeycomb structure. The forming formulation includes two or more types of magnesium-containing materials containing at least talc, and a magnesium-containing material except talc has an average particle diameter of 4 μm or less.

5 Claims, No Drawings

METHOD FOR PRODUCING HONEYCOMB STRUCTURE AND HONEYCOMB STRUCTURE

TECHNICAL FIELD

The present invention relates to a method for producing a honeycomb structure and a honeycomb structure. More particularly, the present invention relates to a method for producing a honeycomb structure, which provides a well shaped honeycomb structure even if organic materials are contained in a small amount in the green body.

BACKGROUND ART

A honeycomb structure made of ceramics has been used for capturing dust and other particulate substances contained in automotive exhaust gas and incineration exhaust gas which occurs at the time of incinerating waste, and furthermore for adsorbing or absorbing the NOx, CO and HC, etc., contained in such exhaust gas. Above all, in such honeycomb structures, cordierite honeycomb structures are used because they have excellent thermal shock resistance (refer to Patent Documents 1 and 2, for example).

A method for producing such a cordierite-type honeycomb structure, for example, that includes extrusion forming a green body, which has increased plasticity, by kneading a ceramic starting material (a forming formulation), water, an organic binder and so on, drying and firing, is disclosed (refer to Patent Document 3, for example). The reason why the organic binders are contained in the green body is that it is difficult to obtain sufficient plasticity and form maintainability using only ceramic material powder and water, therefore. the organic binders and so on are contained in the green body to increase the formability.

Patent Document 1: Japanese Patent Application Laid-open 11-92214

Patent Document 2: Japanese Patent Application Laid-open 11-100259

Patent Document 3: Japanese Patent No. 3227039

The formability of the cordierite type honeycomb structure improves according to the amount of the organic binder added, which gives plasticity and form maintainability. However, if a large amount of organic binder is added, the spaces which are occupied by the organic binder at the time of forming may become defects, because the organic binder will be burnt out at the time of firing. Therefore, there is a problem in that the number of the defects in the honeycomb structure is increased according to the amount of the organic binder added, and this may lead to a decrease in the mechanical strength of the honeycomb structure. Furthermore, in the case of large size honeycomb structures, when the organic binders burn at the time of firing, high thermal stress is occurred by the temperature difference between the inner and the outer of the honeycomb structure because the temperature of the inner part of the honeycomb structure is to be higher than that of the outer part of the honeycomb structure, and this may lead to the occurrence of many defects, such as cracks. By this, there is a problem in that not only is the mechanical strength decreased, but also the productivity or yield is decreased greatly. Furthermore, there also are serious environmental problems such as air pollution, global warming or the like, because of the release of $CO_2$ or poison gases, which are produced by burning the organic binder at the time of firing, into the atmospheric air.

The present invention is made in reference to the above mentioned problems, and is characterized by providing a method for producing a well-shaped honeycomb structure, even though an organic substance, particularly organic binders, are present in the green body in a low amount, and by providing a honeycomb structure obtained by the method for producing the same.

SUMMARY OF THE INVENTION

In order to achieve the above aim, according to the present invention, the following method for producing a honeycomb structure and a honeycomb structure obtained thereby are provided.

According to a first aspect of the present invention, a method for producing a honeycomb structure is provided, which comprises forming a honeycomb shaped article by shaping a green body containing a forming formulation composed of a cordierite forming material and an organic binder into a honeycomb shape, and firing the honeycomb shaped article to obtain a honeycomb structure, wherein the forming formulation contains at least a first magnesium-containing material containing at least talc, and a second magnesium-containing material other than talc, which has an average particle diameter of 4 μm or less.

According to a second aspect of the present invention, the method for producing a honeycomb structure according to the first aspect is provided, wherein an amount of the organic binder is 3 mass % or less with respect to a total amount of the forming formulation.

According to a third aspect of the present invention, the method for producing a honeycomb structure according to the first or second aspects is provided, wherein the second magnesium-containing material is present in an amount of 40 mass % or less with respect to a total of the first magnesium-containing material and the second magnesium-containing material.

According to a fourth aspect of the present invention, the method for producing a honeycomb structure according to any one of the first to third aspects is provided, wherein the second magnesium-containing material is at least one material selected from the group consisting of magnesium hydroxide, magnesium oxide, magnesium carbonate, magnesium silicate other than talc, and magnesium aluminate.

According to a fifth aspect of the present invention, the method for producing a honeycomb structure according to any one of the first to fourth aspects is provided, wherein the kaolin, alumina, aluminum hydroxide, and silica is contained in the forming formulation.

According to a sixth aspect of the present invention, a honeycomb structure, which is obtained by the method for producing a honeycomb structure according to any one of the first to fifth aspects is provided.

According to a seventh aspect of the present invention, the honeycomb structure according to the sixth aspect is provided, wherein the thermal expansion coefficient is $1.7 \times 10^{-6} K^{-1}$ or less.

According to the method for producing a honeycomb structure of the present invention, the formability of the honeycomb structure is increased even if the organic binder is contained less amount in the green body, because talc (the first magnesium-containing material) and a predetermined second magnesium-containing material which has an average particle diameter of 4 μm or less, is contained in the forming formulation as the magnesium source to form the cordierite. According to this method, it is possible to form a honeycomb structure well, and therefore it is possible to obtain a high quality honeycomb structure.

DETAILED DESCRIPTION OF THE INVENTION

The preferred embodiment of the present invention is herein below described concretely, but the present invention is not limited to the embodiment described below. It should also be understood that any design changes, improvements are possible according to the skilled person in the art without deviating from the scope of the present invention.

The method for producing a honeycomb structure of the present invention comprises forming a honeycomb shaped article by shaping a green body containing a forming formulation composed of a cordierite forming material into a honeycomb shape, and firing the honeycomb shaped article to obtain a honeycomb structure. The forming formulation contains two or more types of magnesium-containing materials, including a first magnesium-containing material containing at least talc, and a second magnesium-containing material containing a material other than talc, which has an average particle diameter of 4 µm or less. It is preferable that the amount of the organic binder is 3 mass % or less with respect to a total amount of the forming formulation.

In the present invention, the forming formulation comprising a cordierite forming material is compounded to be the same composition with cordierite (cordierite composition) by mixing the predetermined ceramic materials, so that it forms cordierite by firing. A preferable composition of the cordierite includes $2MgO.2Al_2O_3.5SiO_2$, for example. And, talc, which is the first magnesium-containing material, and the second magnesium-containing material, are the magnesium sources for the cordierite (in the case of containing aluminum or silicon in addition to magnesium, it may also be an aluminum source and a silicon source in addition to a magnesium source).

In the forming formulation, talc ($3MgO.4SiO_2.H_2O$) is usually preferably used as the magnesium source. By using talc, it is possible to reduce the thermal expansion coefficient of the obtained cordierite. However, talc exhibits hydrophobicity at the surface thereof and has a property which does not wet with water. When preparing a green body by kneading the forming formulation with water then extruding such a green body, if such a material, which does not wet with water, is contained in a significant amount, the formability may decrease, then deformation, cracks or agnails may occur in the honeycomb structure. Therefore, increasing the formability by using the organic binder in an amount proportional with respect to the mixing amount of the talc has been tried, but the organic binder is the cause of the reduction in the mechanical strength of the honeycomb structure and environmental pollution, and therefore, it is preferable to use the least amount of the organic binder as possible.

In the method for producing a honeycomb structure of the present invention, in order to increase the formability of the honeycomb structure so as to reduce the amount of the organic binder used, firstly the amount of added talc is reduced, and secondly, a magnesium source which has a smaller average particle diameter (the second magnesium-containing material) is used instead. It is also preferable that the second magnesium-containing material is easily wet with water compared to talc. By using the second magnesium-containing material which easily wets with water, it is possible to increase the formability, because the plasticity of the green body is increased, and furthermore, the second magnesium-containing material also performs the function as the form maintaining agent which keeps the form of the honeycomb structure. By employing whole process mentioned above, it is possible to produce a high quality honeycomb structure.

Here, it is possible to raise the contact angle as the index of the wettability with water. The contact angle means the angle made of a liquid surface and solid surface (the angle inside the liquid is used) at the place at which the free surface of the standstill liquid contacts the wall of the solid (surface), and a smaller contact angle indicates that it is more easily wet. As the contact angle of powder, firstly, the "apparent contact angle" is defined, which is explained below, then it is used as the contact angle or the index of wettability. The "apparent contact angle" is measured by dropping a droplet (about 0.1 cm$^3$) of distilled water on the pellet (φ20 mm×t 5 mm) which is formed by one axis pressure forming of the powder to be tested, the view is taken by video camera, analyzing the form of the droplet immediately after contacting the droplet to the pellet, then measuring the contact angle, and this is to be the "apparent contact angle." As to each contacting angle of the magnesium-containing material, 40-70° for talc, 5-35° for magnesium hydroxide, 7-35° for magnesium oxide, 10-38° for magnesium silicate, and 5-37° for magnesium aluminate, respectively. As the value of the "apparent contact angle" of the second magnesium-containing material, it is preferable to be less than 40°, more preferably 35° or less.

As the second magnesium-containing material, it is preferable to use a powder having an average particle diameter of 4 µm or less, more preferably 3.5 µm or less, further preferably 3.0 µm or less. If larger than 4 µm, it is difficult to obtain the single cordierite crystal phase, and further the thermal expansion coefficient of the cordierite (the honeycomb structure) obtained is larger. The average particle diameter is the value measured by the laser diffraction scattering method (according to JIS R 1629).

The second magnesium-containing material is preferably at least one material selected from the group consisting of magnesium hydroxide ($Mg(OH)_2$), magnesium oxide (MgO), magnesium carbonate ($MgCO_3$), magnesium silicate other than talc, and magnesium aluminate, and more preferably at least one material selected from the group consisting of magnesium hydroxide, magnesium oxide and magnesium carbonate. All of these materials have a property which wet more easily with water than talc, making it possible to improve the formability. As the magnesium silicate other than talc, it is possible to use enstatite ($MgSiO_3$) and forsterite ($Mg_2SiO_4$) and so on. And as the magnesium aluminate, it is possible to use spinel ($MgAl_2O_4$) or the like.

As the containing ratio of the first magnesium-containing material and the second magnesium-containing material contained in the forming formulation, it is preferable that the second magnesium-containing material is contained 40% by mass or less to the total of said first magnesium-containing material and said second magnesium-containing material, and more preferably 30% by mass or less. If more than 40% by mass, it is difficult to obtain a cordierite single crystalline phase at the time of firing to form cordierite, and the thermal expansion coefficient of the obtained cordierite (honeycomb structure) is to be larger.

As to the talc which is the first magnesium-containing material, usually a powder form is used, and the average particle size is not limited particularly, but 0.1-50 µm is preferable, and more preferably 0.5-40 µm.

In the method for producing a honeycomb structure of the embodiment, as the material contained in the forming formulation, it is possible to appropriately choose a material which converts into the cordierite composition ($2MgO.2Al_2O_3.5SiO_2$) other than the above mentioned first magnesium-containing material and the second magnesium-containing material as the whole by firing. For example, it is preferable to contain kaolin ($Al_2O_3.2SiO_2.2H_2O$), alumina ($Al_2O_3$), aluminum hydroxide ($Al(OH)_3$), silica ($SiO_2$). Other than these materials, it is possible to use mullite ($3Al_2O_3 \cdot 2SiO_2$), boehmite (AlOOH), calcined talc and so on.

In the method for producing a honeycomb structure of the embodiment, the above mentioned first magnesium-containing material and the second magnesium-containing material are mixed to be the forming formulation of the cordierite forming material. As the mixing device, it is possible to use an apparatus which is used normally for powder mixing.

In the method for producing a honeycomb structure of the embodiment, the green body is obtained by adding the organic binder to the forming formulation and kneading, and it is also preferable to prepare the green body by adding organic materials such as pore forming materials, surfactants and so on, other than the organic binder, and kneading.

The organic binder functions as a form maintaining agent which maintains the form of the honeycomb shape, as well as improving the plasticity and formability of the green body. On the other hand, the organic binder has problems in that the space the organic binder occupies at the time of shaping may be defects at firing, or may produce the cracks in the honeycomb structure, and this may leads to reduce the mechanical strength of the honeycomb structure, and therefore it is preferable to reduce the amount of the organic binder contained in the green body so as to be as small as possible. And, from the environment problem point of view, it is also preferable to reduce the containing amount of the organic binder so as to be as small as possible. For these reasons, the ratio of the organic binder contained in the present invention is preferably 3% by mass or less to the total amount of the green body, more preferably 2.5% by mass or less, much more preferably 2% by mass or less. Sometimes, even 0% by mass is acceptable for the present invention.

As the organic binders, it is possible to use organic macromolecules, for example. More concretely, it is possible to raise hydroxypropoxyl methylcellulose, hydroxypropyl methylcellulose, methylcellulose, hydroxylethylcellulose, carboxyl methylcellulose, polyvinylalcohol, and so on. It is possible to use one kind alone or a combination of the two or more kinds.

In the method for producing a honeycomb structure of the embodiment, it is preferable to use a pore forming agent in the green body, in the case of manufacturing a honeycomb structure having high porosity. The pore forming agents create the pores having a desirable shape, size, and distribution in the honeycomb structure, and increase the porosity, and therefore, it is possible to obtain a honeycomb structure having a high porosity. As this kind of pore forming agent, it is possible to use, for example, graphite, wheat flour, starch, phenolic resin, polymethacrylicmethyl, polyethylene, polyethyleneterephthalate, or foaming resin (acrylonitrilic plastic balloon) or the like. These materials will burn out after forming pores. Above all, foaming resin is preferable from the view point of restraining the outbreak of $CO_2$ and harmful gas and also restraining the occurrence of cracks in the honeycomb structure. Furthermore, in case of using the pore forming agents, the containing ratio of the pore forming agents is not limited particularly, but preferably 15% by mass or less, more preferably 13% by mass or less, to total amount of the green body. If more than 15% by mass, the mechanical strength of the honeycomb structure obtained may be reduced.

In the method for producing a honeycomb structure of the carried out embodiment, it is preferable to contain a surfactant in the green body. The orientation of the material particles are easily occurred by the surfactant at the time of extrusion forming, as well as surfactant increases the dispersibility of the material particles. Of course, the surfactant also increases the wettability of talc by acting to the hydrophobicity surface of talc particles. As the surfactant, any of anionic, cationic, nonionic, or amphoteric are possible to be used, however, anionic surfactant such as fatty acid salt, alkyl sulfuric acid ester salt, polyoxyethylene alkylether sulfuric acid ester salt, polycarboxylic acid solt, polyacrylic acid salt, and nonionic surfactant such as polyoxyethylene alkylether, polyoxyethylene glycerin fatty acid ester, polyoxyethylene sorbitan (or sorbitol) fatty acid ester and so on are suitable examples. Lauric acid potassium is particularly preferable from the view point of the particle materials.

Furthermore, it is preferable to contain water as the dispersing vehicle in the green body. As to the ratio of the dispersing vehicle, it is possible to adjust the amount of the dispersing vehicle so that the green body has an appropriate hardness at the time of forming. The amount of the dispersing vehicle is preferably 10-50% by mass with respect to the total of the forming formula. In the method for producing a honeycomb structure of the embodiment, an excellent effect is shown for preparing the green body by kneading the forming formula containing water. By using water as the dispersing vehicle and using one part of the magnesium-containing material (the second magnesium-containing material) which is easily wet with water, the forming formula becomes familiar with the water, and the formability is increased thereby.

In the method for producing a honeycomb structure of the carried out embodiment, there is no particular limitation with respect to a method for preparing the green body by adding the organic materials (the organic binder, the pore forming agents, the surfactant and so on) and kneading thereof, and it is possible to use a method which uses a kneader, a de-airing pugmill or the like.

In the method for producing a honeycomb structure of the embodiment, it is preferable to shape the green body into the honeycomb shape, and to form a honeycomb formed article by drying thereof. There is no particular limitation for the configuration of honeycomb shape, and it is possible to indicate, for example, a body which has a plurality of cells formed penetrating between a pair of end faces by honeycomb shaped partition walls. For using a honeycomb shape as a filter such as DPF or the like, it is preferable to plug the one end of the cell and another end of the adjacent cell alternatively. Also, there is no limitation for the outer configuration of the honeycomb shape, and it is possible to use, for example, a cylindrical shape, a quadratic prism, a triangular prism and the like. Furthermore, there is also no limitation on the configuration of cells (cell configuration in the cross section perpendicular to the direction of the cell formation) of the honeycomb shape, and it is possible to use, for example, a quadrangular, hexagonal, triangular shaped cells.

There is no particular limitation for preparing a honeycomb formed article, and it is possible to use traditionally known forming processes such as extrusion forming, injection forming, and press forming. It is most preferable to use an the extrusion forming method by using the extrusion dies which have a desired cell configuration, wall thickness, cell density to extrude the prepared green body mentioned above. Also, there is no particular limitation for the method of drying, and it is possible to use any traditionally known drying process such as hot air drying, microwave drying, dielectric drying, decompression drying, vacuum drying, freeze drying and so on. Above all, it is preferable to use combination drying process of hot air drying, and microwave drying or dielectric drying, because it is possible to dry the honeycomb shape quickly and uniformly as a whole.

In the method for producing a honeycomb structure of the embodiment, the honeycomb formed article may be calcined before the final firing. The "calcination" in the present invention means an operation which removes any kind of organic materials (binder, pore forming agent, surfactant or the like) in the honeycomb shape by combustion, and it is also referred to as the resin removal step or the binder removal step. The calcination temperature should be on the order of 100-800° C. because the burning temperature of the organic binder is on the order of 100-300° C., and the burning temperature of the pore forming agent is on the order of 200-800° C., and the burning temperature of the surfactant is on the order of 100-400° C. in general. The calcination time is on the order of 1-20 hours usually, even though there is no particular limitation, but in the present invention, the calcination time can be reduced, because it is possible to use a small amount of the organic binder. More concretely, the calcination time is on the order of 0.5-10 hours. By this, the productivity is improved because it is possible to reduce the manufacturing time.

Finally, the porous honeycomb structure is obtained by firing (main firing or final firing) the calcined body obtained as mentioned above. The "main firing" of the present invention means the operation which attains the predetermined mechanical strength by densifying through sintering the forming material of the calcined body. As the firing conditions (temperature and time), it is preferable to fire the ceramic formed body at 1300-1500° C., and 1350-1450° C. is more preferable. If the temperature is lower than 1300° C., it may be difficult to obtain the desired cordierite single crystal phase, and if the temperature is higher than 1500° C., melting may occur. For the firing atmosphere, it is possible to use an air atmosphere, an atmosphere in which oxygen and nitrogen are mixed in a predetermined ratio, and so on. Further, the firing time is preferably on the order of 1-12 hours.

The honeycomb structure of the present invention is one which is obtained by the above mentioned producing method, and it is a honeycomb structure having a high quality (less defects and cracks, smaller thermal expansion coefficient).

The honeycomb structure of the present invention preferably has a thermal expansion coefficient of $1.7 \times 10^{-6} K^{-1}$ or less, more preferably $1.5 \times 10^{-6} K^{-1}$ or less. If the thermal expansion coefficient is larger than $1.7 \times 10^{-6} K^{-1}$, the thermal shock resistance of the honeycomb structure is decreased, and it may be destroyed by thermal stress at the time of actual use.

EXAMPLES

The present invention will be explained by examples below, but the present invention is not restricted at all by these examples.

Examples 1-15

Talc, as the first magnesium-containing material, and the second magnesium-containing material (the second magnesium source), as shown in the Table 1, are mixed so that the containing ratio of the second magnesium source to the total amount of talc and the second magnesium source is the respective value shown in Table 1. The average particle diameter (particle size) (μm) of the second magnesium source used is also shown in Table 1. The cordierite forming material (the forming formula) is prepared by adding kaolin, alumina, aluminum hydroxide and silica thereto. The cordierite forming material is the starting material (raw material) having a composition which converts into the cordierite by firing. The average particle diameter is a value measured by the laser diffraction scattering method (according to JIS R 1629).

Then the green body is obtained by adding methylcellulose as the organic binder in the amount shown in Table 1 (the organic binder (% by mass)) with respect to the total amount of the forming formula, further, adding 0.5% by mass of lauric acid as the surfactant to the total of the forming formula, and adding 30% by mass of water to the total amount of the forming formula, and then kneading.

The obtained green body is formed by extrusion forming into a honeycomb shape using a die which can form a honeycomb shape having a 300 μm of wall thickness, and a cell density of 300 cells/inch$^2$ (=46.5 cells/cm$^2$). The obtained formed article having a honeycomb shape is the one which has no abnormality in forming pressure, defects, or cracks. The appearance of the shape is also shown in Table 1. Then, the obtained formed article having a honeycomb shape is dried by hot air drying after dielectric drying to obtain the honeycomb formed article, and the obtained honeycomb formed article is fired at 1420° C. for 4 hours in an air atmosphere to obtain the final honeycomb structure (Examples 1-15).

TABLE 1

|  | Second magnesium source | Particle size of second magnesium source (μm) | Ratio of second magnesium source (% by mass) | Organic binder (% by mass) | Appearance at the time of forming | Thermal expansion coefficient ($\times 10^{-6} K^{-1}$) |
|---|---|---|---|---|---|---|
| Example 1 | MgO | 1 | 5 | 2 | Fine | 1.1 |
| Example 2 | MgO | 1 | 10 | 2 | Fine | 1.3 |
| Example 3 | MgO | 1 | 20 | 2 | Fine | 1.3 |
| Example 4 | MgO | 1 | 40 | 2 | Fine | 1.4 |
| Example 5 | Mg(OH)$_2$ | 0.6 | 5 | 2 | Fine | 1.0 |
| Example 6 | Mg(OH)$_2$ | 0.6 | 10 | 2 | Fine | 1.2 |
| Example 7 | Mg(OH)$_2$ | 0.6 | 20 | 2 | Fine | 1.4 |
| Example 8 | Mg(OH)$_2$ | 0.6 | 40 | 2 | Fine | 1.4 |
| Example 9 | MgCO$_3$ | 1.2 | 5 | 2 | Fine | 1.1 |
| Example 10 | MgCO$_3$ | 1.2 | 10 | 2 | Fine | 1.2 |
| Example 11 | MgCO$_3$ | 1.2 | 20 | 2 | Fine | 1.3 |
| Example 12 | MgCO$_3$ | 1.2 | 40 | 2 | Fine | 1.5 |
| Example 13 | MgO | 1 | 50 | 2 | Fine | 1.7 |
| Example 14 | Mg(OH)$_2$ | 0.6 | 50 | 2 | Fine | 1.6 |
| Example 15 | MgCO$_3$ | 1.2 | 50 | 2 | Fine | 1.7 |
| Com. Exam 1 | MgO | 1 | 50 | 6 | Fine | 2.0 |
| Com. Exam 2 | MgO | 5 | 40 | 6 | Fine | 1.8 |
| Com. Exam 3 | Mg(OH)$_2$ | 0.6 | 50 | 6 | Fine | 1.9 |
| Com. Exam 4 | Mg(OH)$_2$ | 6 | 40 | 6 | Fine | 1.8 |

TABLE 1-continued

|  | Second magnesium source | Particle size of second magnesium source (μm) | Ratio of second magnesium source (% by mass) | Organic binder (% by mass) | Appearance at the time of forming | Thermal expansion coefficient ($\times 10^{-6} K^{-1}$) |
|---|---|---|---|---|---|---|
| Com. Exam 5 | $MgCO_3$ | 1.2 | 50 | 6 | Fine | 1.9 |
| Com. Exam 6 | $MgCO_3$ | 6 | 40 | 6 | Fine | 2.0 |
| Com. Exam 7 | MgO | 5 | 40 | 2 | Pressure increase | — |
| Com. Exam 8 | $Mg(OH)_2$ | 6 | 40 | 2 | Pressure increase | — |
| Com. Exam 9 | $MgCO_3$ | 6 | 40 | 2 | Pressure increase | — |
| Com. Exam 10 | None | — | — | 6 | Fine | 0.9 |
| Com. Exam 11 | None | — | — | 2 | Pressure increase | — |

Com. Exam.: Comparative Example

The X-ray diffraction identification of the obtained honeycomb structure shows that cordierite is the main crystalline phase. All of the obtained honeycomb structures have a thermal expansion coefficient of less than $1.7 \times 10^{-6} K^{-1}$, as shown in Table 1.

Comparative Examples 1-9

Talc, as the first magnesium-containing material, and the second magnesium-containing material (the second magnesium source), as shown in the Table 1, are mixed so that the containing ratio of the second magnesium source to the total amount of talc and the second magnesium source is to be respective value, as shown in Table 1. The average particle diameter (particle size) (μm) of the second magnesium source used is also shown in Table 1. The cordierite forming material (the forming formula) is prepared by adding kaolin, alumina, aluminum hydroxide and silica thereto.

Then the green body is obtained by adding methylcellulose as the organic binder in the amount shown in Table 1 (the organic binder (% by mass)) to the total amount of the forming formula, further, adding 0.5% by mass of lauric acid potassium as the surfactant to the total of the forming formula, and adding 30% by mass of water to the total amount of the forming formula, and kneading.

The obtained green body is formed by extrusion forming a honeycomb shape using a die which can form a honeycomb shape having a 300 μm wall thickness, and a cell density of 300 cells/inch$^2$ (=46.5 cells/cm$^2$). The obtained formed article having the honeycomb shape of Comparative Examples 1-6 have no abnormality in forming pressure, defects, or cracks, however, in Comparative Examples 7-9, an abnormality in forming pressure (pressure rising) is recognized, and therefore the formed article was not obtained. The appearance of the shape is also shown in Table 1. Then, the obtained formed article having a honeycomb shape is dried by hot air drying after dielectric drying to obtain the honeycomb formed article, and the obtained honeycomb shape is fired at 1420° C. for 4 hours in an air atmosphere to obtain the final honeycomb structure.

The X-ray diffraction identification of the obtained honeycomb structure shows that cordierite is the main crystalline phase. All of the obtained honeycomb structures have a thermal expansion coefficient of larger than $1.7 \times 10^{-6} K^{-1}$, as shown in Table 1.

Comparative Examples 10, 11

The cordierite forming material (the forming formula) is prepared by adding kaolin, alumina, aluminum hydroxide and silica to talc as the first magnesium-containing material (the second magnesium-containing material is not used).

Then the green body is obtained by adding methylcellulose as the organic binder in the amount shown in Table 1 (the organic binder (% by mass)) to the total amount of the forming formula, further, adding 0.5% by mass of lauric acid potassium as the surfactant to the total of the forming formula, and adding 30% by mass of water to the total amount of the forming formula, and by kneading.

The obtained green body is formed by extrusion forming into a honeycomb shape using a die which can form the honeycomb shape having a 300 μm wall thickness and a cell density of 300 cells/inch$^2$ (=46.5 cells/cm$^2$). In Comparative Example 10, the obtained formed article having a honeycomb shape had no abnormality in forming pressure, defects, or cracks, however, in Comparative Example 11, an abnormality in forming pressure (pressure rising) is recognized, and therefore the formed article was not obtained. The appearance of the shape is also shown in Table 1. Then, the obtained formed article having a honeycomb shape is dried by hot air drying after dielectric drying to obtain the honeycomb formed article, and the obtained honeycomb formed article is fired at 1420° C. for 4 hours in an air atmosphere to obtain the final honeycomb structure.

The X-ray diffraction identification of the obtained honeycomb structure shows that the cordierite is the main crystalline phase. All of the obtained honeycomb structures have a thermal expansion coefficient of less than $1.7 \times 10^{-6} K^{-1}$, as shown in Table 1.

INDUSTRIAL APPLICABILITY

The present invention can be utilized to produce a honeycomb structure suitably used in various kinds of separating apparatus and purifying apparatus for preventing the environmental pollution and the global warming, in the fields of chemical, electric power, steel, industrial waste processing, or the like.

The invention claimed is:
1. A method for producing a honeycomb structure, comprising:
   forming a honeycomb article by shaping a green body, comprising a forming formulation including a cordierite forming material and an organic binder, into a honeycomb shaped article; and
   firing the honeycomb shaped article to obtain a honeycomb structure;

wherein said forming formulation includes at least a first magnesium-containing material containing talc and a second magnesium-containing material, other than talc, which has an average particle diameter of 1.2 μm or less;

wherein said organic binder is present in an amount of 2 mass % or less with respect to a total amount of said forming formulation; and wherein an amount of said second magnesium-containing material is 20 mass % or less with respect to a total amount of said first magnesium-containing material and said second magnesium-containing material.

2. The method for producing a honeycomb structure according to claim 1, wherein said second magnesium-containing material is at least one material selected from the group consisting of magnesium hydroxide, magnesium oxide, magnesium carbonate, magnesium silicate other than talc, and magnesium aluminate.

3. The method for producing a honeycomb structure according to claim 1, wherein said forming formulation includes kaolin, alumina, aluminium hydroxide, and silica.

4. A honeycomb structure obtained by the method for producing a honeycomb structure according to claim 1.

5. The method for producing a honeycomb structure according to claim 1, wherein a thermal expansion coefficient of the honeycomb structure is $1.5 \times 10^{-6} K^{-1}$ or less.

* * * * *